United States Patent
Hosaka et al.

(10) Patent No.: US 9,683,059 B2
(45) Date of Patent: Jun. 20, 2017

(54) SOLID CATALYST COMPONENT FOR POLYMERIZATION OF OLEFINS, CATALYST FOR POLYMERIZATION OF OLEFINS, AND METHOD FOR PRODUCING OLEFIN POLYMER

(71) Applicant: TOHO TITANIUM CO., LTD., Chigasaki-shi, Kanagawa (JP)

(72) Inventors: Motoki Hosaka, Chigasaki (JP); Hidetoshi Umebayashi, Chigasaki (JP); Toshihiko Sugano, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 0 days.

(21) Appl. No.: 14/427,099

(22) PCT Filed: Sep. 24, 2013

(86) PCT No.: PCT/JP2013/075687
§ 371 (c)(1),
(2) Date: Mar. 10, 2015

(87) PCT Pub. No.: WO2014/050809
PCT Pub. Date: Apr. 3, 2014

(65) Prior Publication Data
US 2015/0240001 A1 Aug. 27, 2015

(30) Foreign Application Priority Data

Sep. 28, 2012 (JP) ................................. 2012-215725

(51) Int. Cl.
| C08F 110/06 | (2006.01) |
| C08F 210/06 | (2006.01) |
| C08F 299/02 | (2006.01) |
| C08F 210/16 | (2006.01) |
| C08F 297/08 | (2006.01) |

(52) U.S. Cl.
CPC .......... *C08F 110/06* (2013.01); *C08F 210/06* (2013.01); *C08F 210/16* (2013.01); *C08F 297/08* (2013.01); *C08F 299/02* (2013.01)

(58) Field of Classification Search
None
See application file for complete search history.

(56) References Cited

U.S. PATENT DOCUMENTS

| 4,255,544 A | 3/1981 | Kimura et al. |
| 5,354,820 A | 10/1994 | Funabashi |
| 5,726,262 A | 3/1998 | Kioka et al. |
| 6,156,690 A * | 12/2000 | Hosaka ................... C08F 10/00 502/103 |
| 2007/0244277 A1* | 10/2007 | Hosaka ................... C08F 10/00 526/128 |
| 2011/0040051 A1* | 2/2011 | Xie ......................... C08F 10/06 526/147 |

FOREIGN PATENT DOCUMENTS

| JP | 55-149307 A | 11/1980 |
| JP | 1-139601 A | 6/1989 |
| JP | 2006-63281 A | 3/2006 |
| JP | 2008-74948 A | 4/2008 |
| JP | 2012-162651 A | 8/2012 |

OTHER PUBLICATIONS

International Search Report dated Dec. 10, 2013 issued in corresponding application No. PCT/JP2013/075687.
Exended European Search Report issued on Jun. 15, 2016 in European Patent Application No. 13842095.5 (7 pages).

* cited by examiner

*Primary Examiner* — Catherine S Branch
(74) *Attorney, Agent, or Firm* — Westerman, Hattori, Daniels & Adrian, LLP

(57) ABSTRACT

A solid catalyst component for olefin polymerization makes it possible to polymerize an olefin with high polymerization activity when used for an olefin polymerization catalyst, and produce an olefin polymer having a low fine powder content, a low coarse powder content, and a low volatile organic compound (VOC) content in high yield. The solid catalyst component for olefin polymerization is produced by suspending (a) a dialkoxymagnesium, and (b) at least one alcohol selected from ethanol, n-propanol, n-butanol, isopropanol, isobutanol, and t-butanol, in an inert organic solvent so that the total amount of the alcohol is 0.5 to 1.5 parts by mass based on 100 parts by mass of the dialkoxymagnesium, to prepare a suspension, and bringing (c) an internal electron donor and (d) a titanium halide compound into contact with the suspension.

11 Claims, No Drawings

SOLID CATALYST COMPONENT FOR POLYMERIZATION OF OLEFINS, CATALYST FOR POLYMERIZATION OF OLEFINS, AND METHOD FOR PRODUCING OLEFIN POLYMER

TECHNICAL FIELD

The present invention relates to a solid catalyst component for olefin polymerization, an olefin polymerization catalyst, and a method for producing an olefin polymer.

BACKGROUND ART

A solid catalyst component that includes magnesium, titanium, an internal electron donor, and a halogen as essential components has been used when polymerizing an olefin (e.g., propylene). A number of methods that polymerize an olefin or copolymerize olefins in the presence of an olefin polymerization catalyst that includes the solid catalyst component, an organoaluminum compound, and an organosilicon compound, have been proposed.

For example, Patent Document 1 (JP-A-55-149307) discloses a solid catalyst component for ethylene polymerization that is obtained by bringing a magnesium dialkoxide and an alcohol in an amount equal to or more than 0.1-fold mol with respect to the magnesium dialkoxide into contact with each other to effect a reaction.

RELATED-ART DOCUMENT

Patent Document

Patent Document 1: JP-A-55-149307

SUMMARY OF THE INVENTION

Technical Problem

However, when an olefin is polymerized using a polymerization catalyst that includes the solid catalyst component disclosed in Patent Document 1, since the solid catalyst component has a high fine powder content, and breakage of the particles occurs during polymerization due to the heat of reaction, a large amount of fine powder is included in the resulting polymer, and the process is hindered due to clogging of a pipe that occurs when transferring the polymer, for example.

A polymerization catalyst that can produce an olefin polymer having a low fine powder content (particle size: smaller than 75 μm), a low coarse powder content (particle size: larger than 2800 μm), and a narrow particle size distribution in high yield has been desired in order to ensure smooth polymerization of an olefin.

When an olefin is polymerized using a polymerization catalyst that includes the solid catalyst component disclosed in Patent Document 1, the resulting polymer includes an organic solvent that is used as a dispersion medium when producing the solid catalyst component, and a volatile organic compound (hereinafter appropriately referred to as "VOC") such as an olefin monomer. Such a volatile organic compound (VOC) may volatilize when removing gas from the reaction vessel, removing the resulting polymer, and transferring the polymer to a post-treatment system, and may be released to an inert gas circulation system or the atmosphere.

The amount of volatile organic compound (VOC) to be released to the atmosphere may be reduced by heating the reaction vessel in which the volatile organic compound (VOC) is produced, volatilizing and removing the volatile organic compound (VOC) from the reaction vessel in advance, and then removing the resulting polymer, for example. However, when the resulting polymer is a propylene-ethylene copolymer or the like, a rubber component or the like included in the copolymer particles may bleed out from the copolymer particles when the reaction vessel is heated, and the flowability of the copolymer deteriorates due to stickiness.

In view of the above situation, an object of the invention is to provide a solid catalyst component for olefin polymerization that makes it possible to polymerize an olefin with high polymerization activity when used for an olefin polymerization catalyst, and produce an olefin polymer having a low fine powder content, a low coarse powder content, and a low volatile organic compound (VOC) content in high yield, an olefin polymerization catalyst that utilizes the solid catalyst component, and a method for producing an olefin polymer.

Solution To Problem

The inventors of the invention conducted extensive studies in order to solve the above technical problem. As a result, the inventors found that the above technical problem can be solved by a solid catalyst component for olefin polymerization that is produced by suspending (a) a dialkoxymagnesium, and (b) at least one alcohol selected from ethanol, n-propanol, n-butanol, isopropanol, isobutanol, and t-butanol, in an inert organic solvent so that the total amount of the alcohol is 0.5 to 1.5 parts by mass based on 100 parts by mass of the dialkoxymagnesium, to prepare a suspension, and bringing (c) an internal electron donor and (d) a titanium halide compound into contact with the suspension. This finding has led to the completion of the invention.

Several aspects of the invention provide the following.

(1) A solid catalyst component for olefin polymerization that is produced by suspending (a) a dialkoxymagnesium, and (b) at least one alcohol selected from ethanol, n-propanol, n-butanol, isopropanol, isobutanol, and t-butanol, in an inert organic solvent so that the total amount of the alcohol is 0.5 to 1.5 parts by mass based on 100 parts by mass of the dialkoxymagnesium, to prepare a suspension, and bringing (c) an internal electron donor and (d) a titanium halide compound into contact with the suspension.

(2) An olefin polymerization catalyst including:

(α) the solid catalyst component according to (1) (hereinafter may be referred to as "solid catalyst component (α)");

(β) an organoaluminum compound represented by the following general formula (I) (hereinafter may be referred to as "organoaluminum compound (β)"),

$$R^1_p AlQ_{3-p} \quad (I)$$

wherein $R^1$ is a hydrocarbyl group having 1 to 6 carbon atoms, provided that a plurality of $R^1$ are either identical or different when a plurality of $R^1$ are present, Q is a hydrogen atom, a hydrocarbyloxy group having 1 to 6 carbon atoms, or a halogen atom, provided that a plurality of Q are either identical or different when a plurality of Q are present, and p is a real number that satisfies $0<p\leq 3$; and (γ) an external electron donor compound (hereinafter may be referred to as "external electron donor compound (γ)").

(3) The olefin polymerization catalyst according to (2), wherein the external electron donor compound (γ) is one or more compounds selected from an organosilicon compound represented by the following general formula (II) and an aminosilane compound represented by the following general formula (III),

  (II)

wherein $R^2$ is an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 15 carbon atoms, or a substituted aromatic hydrocarbon group having 6 to 15 carbon atoms, provided that a plurality of $R^2$ are either identical or different when a plurality of $R^2$ are present, $R^3$ is an alkyl group having 1 to 4 carbon atoms, a vinyl group, an alkenyl group having 3 to 12 carbon atoms, a cycloalkyl group having 3 to 6 carbon atoms, an aromatic hydrocarbon group having 6 to 12 carbon atoms, or a substituted aromatic hydrocarbon group having 7 to 12 carbon atoms, provided that a plurality of $R^3$ are either identical or different when a plurality of $R^3$ are present, and q is an integer. from 0 to 3,

  (III)

wherein $R^4$ and $R^5$ are a hydrogen atom, an alkyl group having 1 to 20 carbon atoms, a vinyl group, an alkenyl group having 3 to 20 carbon atoms, a cycloalkyl group having 3 to 20 carbon atoms, a cycloalkenyl group having 3 to 20 carbon atoms, or an aryl group having. 6 to 20 carbon atoms, provided that $R^4$ and $R^5$ that form the $R^4R^5N$ group are either identical or different, and optionally bond to each other to form a ring, and a plurality of $R^4R^5N$ groups are either identical or different when a plurality of $R^4R^5N$ groups are present, $R^6$ is an alkyl group having 1 to 20 carbon atoms, a vinyl group, an alkenyl group having 3 to 12 carbon atoms, an alkoxy group having 1 to 20 carbon atoms, a vinyloxy group, an alkenyloxy group having 3 to 20 carbon atoms, a cycloalkyl group having 3 to 20 carbon atoms, a cycloalkyloxy group having 3 to 20 carbon atoms, an aryl group having 6 to 20 carbon atoms, or an aryloxy group having 6 to 20 carbon atoms, provided that a plurality of $R^6$ are either identical or different when a plurality of $R^6$ are present, and s is an integer from 1 to 3.

(4) The olefin polymerization catalyst according to (3), wherein the external electron donor compound (γ) is phenyltrimethoxysilane, n-butyltrimethoxysilane, cyclopentyltrimethoxysilane, cyclohexyltrimethoxysilane, phenyltriethoxysilane, n-butyltriethoxysilane, cyclopentyltriethoxysilane, cyclohexyltriethoxysilane, t-butylmethyldimethoxysilane, t-butylethyldimethoxysilane, diisopropyldimethoxysilane, diisobutyldimethoxysilane, diisopentyldimethoxysilane, diphenyldimethoxysilane, dicyclopentyldimethoxysilane, cyclohexylmethyldimethoxysilane, cyclohexylcyclopentyldimethoxysilane, tetramethoxysilane, tetraethoxysilane, t-butylmethylbis(ethylamino)silane, dicyclohexylbis(ethylamino)silane, dicyclopentylbis(ethylamino)silane, bis(perhydroisoquinolino)dimethoxysilane, diethylaminotrimethoxysilane, or diethylaminotriethoxysilane.

(5) The olefin polymerization catalyst according to (2), wherein the external electron donor compound (γ) is one or more compounds selected from a diether compound represented by the following general formula (IV), $R^7OCH_2CR^8R^9CH_2OR^{10}$  (IV)

wherein $R^8$ and $R^9$ are a hydrogen atom, a halogen atom, an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a halogen-substituted aromatic hydrocarbon group having 6 to 12 carbon atoms, a substituted aromatic hydrocarbon group having 7 to 12 carbon atoms, an alkylamino group having 1 to 12 carbon atoms, or a dialkylamino group having 2 to 12 carbon atoms, provided that $R^8$ and $R^9$ are either identical or different, and optionally bond to each other to form a ring, and $R^7$ and $R^{10}$ are an alkyl group having 1 to 12 carbon atoms, a vinyl group, an alkenyl group having 3 to 12 carbon atoms, a cycloalkyl group having 3 to 6 carbon atoms, an aromatic hydrocarbon group having 6 to 12 carbon atoms, a halogen-substituted aromatic hydrocarbon group having 6 to 12 carbon atoms, or a substituted aromatic hydrocarbon group having 7 to 12 carbon atoms, provided that $R^7$ and $R^{10}$ are either identical or different.

(6) The olefin polymerization catalyst according to (5), wherein the diether compound is 2-isopropyl-2-isobutyl-1,3-dimethoxypropane or 9,9-bis(methoxymethyl)fluorene.

(7) A method for producing an olefin polymer including polymerizing an olefin in the presence of the olefin polymerization catalyst according to any one of (2) to (6).

Advantageous Effects of the Invention

The aspects of the invention can thus provide a solid catalyst component for olefin polymerization that makes it possible to polymerize an olefin with high polymerization activity when used for an olefin polymerization catalyst, and produce an olefin polymer having a low fine powder content, a low coarse powder content, and a low volatile organic compound (VOC) content in high yield, an olefin polymerization catalyst that utilizes the solid catalyst component, and a method for producing an olefin polymer.

DESCRIPTION OF EMBODIMENTS

A solid catalyst component for olefin polymerization (hereinafter appropriately referred to as "solid catalyst component") according to one embodiment of the invention is described below.

The solid catalyst component according to one embodiment of the invention is produced by suspending (a) a dialkoxymagnesium, and (b) at least one alcohol selected from ethanol, n-propanol, n-butanol, isopropanol, isobutanol, and t-butanol, in an inert organic solvent so that the total amount of the alcohol is 0.5 to 1.5 parts by mass based on 100 parts by mass of the dialkoxymagnesium, to prepare a suspension, and bringing (c) an internal electron donor and (d) a titanium halide compound into contact with the suspension.

The solid catalyst component according to one embodiment of the invention is characterized by being produced (specified) by the above specific production method. The production method that produces the solid catalyst component according to one embodiment of the invention is described in detail below.

A dialkoxymagnesium represented by the following general formula (V) is preferable as the dialkoxymagnesium (a) used to produce the solid catalyst component according to one embodiment of the invention.

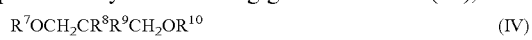  

wherein $R^{11}$ is a linear alkyl group having 1 to 4 carbon atoms, an isopropyl group, or an isobutyl group, provided that the two $R^{11}$ are either identical or different.

Specific examples of the dialkoxymagnesium (a) include dimethoxymagnesium, diethoxymagnesium, dipropoxymagnesium, methoxyethoxymagnesium, ethoxypropoxymagnesium, ethoxybutoxymagnesium, and the like. Among these, methoxyethoxymagnesium, diethoxymagnesium, ethoxypropoxymagnesium, and dipropoxymagnesium are preferable, and diethoxymagnesium is more preferable.

These dialkoxymagnesiums may be used either alone or in combination.

These dialkoxymagnesiums may be prepared by reacting magnesium metal with an alcohol in the presence of a halogen, a halogen-containing metal compound, or the like, for example.

The dialkoxymagnesium (a) is normally in the form of granules or a powder. In particular, a dialkoxymagnesium having a spherical shape, an elliptical shape, or a potato-like shape may preferably be used as the dialkoxymagnesium (a).

It is preferable that the dialkoxymagnesium (a) have an average value (sphericity) of the ratio (1/w) of the major axis diameter (1) to the minor axis diameter (w) of 2 or less, more preferably of 1 to 2, and still more preferably of 1 to 1.5.

When a dialkoxymagnesium having a spherical shape, an elliptical shape, or a potato-like shape is used as the dialkoxymagnesium (a), the resulting polymer powder has a better particle shape and a narrower particle size distribution, and it is possible to easily improve the handling capability of the polymer powder during polymerization.

It is preferable that the dialkoxymagnesium (a) used to produce the solid catalyst component according to one embodiment of the invention have an average particle size of 10 to 100 µm, more preferably 10 to 70 µm, and still more preferably 20 to 60 µm.

When the average particle size of the dialkoxymagnesium (a) is within the above range, it is possible to improve the flowability of the resulting solid catalyst component.

It is preferable that the dialkoxymagnesium (a) used to produce the solid catalyst component according to one embodiment of the invention have a low fine particle content and a low coarse particle content, and have a narrow particle size distribution. Specifically, it is preferable that the dialkoxymagnesium (a) have a volumetric cumulative particle size distribution (volume statistical particle size distribution) in which the content of particles having a particle size of 5 µm or less is 20% or less, and more preferably 10% or less, and the content of particles having a particle size of more than 100 µm is 20% or less, and more preferably 10% or less.

Note that the terms "particle size" and "particle size distribution" used herein in connection with the dialkoxymagnesium (a) respectively refer to the volumetric cumulative particle size and the volumetric cumulative particle size distribution (volume statistical particle size and volume statistical particle size distribution) determined by subjecting the dialkoxymagnesium (a) that is uniformly dispersed in anhydrous ethanol to automatic measurement in the normal mode (0.12 to 704 µm, 100 ch) in a nitrogen atmosphere using a laser scattering/diffraction particle size analyzer ("MICROTRAC HRA 9320-X100" manufactured by Nikkiso Co., Ltd.), and the term "average particle size" used herein in connection with the dialkoxymagnesium (a) refers to the particle size (D50) at 50% in the volumetric cumulative particle size distribution that is determined as described above.

It is preferable that the dialkoxymagnesium (a) used to produce the solid catalyst component according to one embodiment of the invention have a specific surface area of 10 $m^2$/g or more, more preferably 10 to 50 $m^2$/g, and still more preferably 10 to 30 $m^2$/g.

When the specific surface area of the dialkoxymagnesium (a) is 10 $m^2$/g or more, it is possible to easily control the reactivity of the resulting solid catalyst component.

Note that the term "specific surface area" used herein in connection with the dialkoxymagnesium (a) refers to the specific surface area of a sample (that has been dried at 50° C. for 2 hours under vacuum) measured by a BET method (automatic measurement) in the presence of a mixed gas of nitrogen and helium using an analyzer "Automatic Surface Area Analyzer HM model-1230" (manufactured by Mountech).

It is preferable that the dialkoxymagnesium (a) used to produce the solid catalyst component according to one embodiment of the invention have a bulk density of 0.1 to 0.6 g/ml, more preferably 0.2 to 0.6 g/ml, still more preferably 0.2 to 0.5 g/ml, and yet more preferably 0.2 to 0.4 g/ml.

When the bulk density of the dialkoxymagnesium (a) is within the above range, the particles of the dialkoxymagnesium (a) have a moderate pore volume and a moderate pore size. Therefore, a catalyst can be smoothly prepared, and a uniform polymerization reaction easily proceeds when the resulting catalyst is used for polymerization. In particular, when subjecting propylene and ethylene or the like to block copolymerization, a rubber component is easily held inside the particles of the dialkoxymagnesium (a).

The dialkoxymagnesium (a) may be prepared using a known method. For example, the dialkoxymagnesium (a) may be prepared using the method disclosed in JP-A-58-41832, JP-A-62-51633, JP-A-3-74341, JP-A-4-368391, JP-A-8-73388, or the like.

When producing the solid catalyst component according to one embodiment of the invention, the dialkoxymagnesium (a) and at least one alcohol (b) selected from ethanol, n-propanol, n-butanol, isopropanol, isobutanol, and t-butanol, are suspended in the inert organic solvent.

The alcohol is preferably at least one compound selected from ethanol, isopropanol, isobutanol, and t-butanol.

The alcohol (b) is suspended in the inert organic solvent so that the total amount of the alcohol (b) is 0.5 to 1.5 parts by mass based on 100 parts by mass of the dialkoxymagnesium (a). It is preferable to suspend the alcohol (b) in the inert organic solvent so that the total amount of the alcohol (b) is 0.7 to 1.5 parts by mass based on 100 parts by mass of the dialkoxymagnesium (a). It is more preferable to suspend the alcohol (b) in the inert organic solvent so that the total amount of the alcohol (b) is 1.0 to 1.5 parts by mass based on 100 parts by mass of the dialkoxymagnesium (a). It is still more preferable to suspend the alcohol (b) in the inert organic solvent so that the total amount of the alcohol (b) is 1.0 to 1.3 parts by mass based on 100 parts by mass of the dialkoxymagnesium (a).

When the alcohol (b) is suspended so that the total amount of the alcohol (b) based on 100 parts by mass of the dialkoxymagnesium (a) is within the above range, it is possible to provide a solid catalyst component for olefin polymerization that makes it possible to polymerize an olefin with high polymerization activity, and produce an olefin polymer having a low fine powder content, a low coarse powder content, and a low volatile organic compound (VOC) content in high yield.

Note that a dialkoxymagnesium sample may include a small amount of an alcohol selected from ethanol, n-propanol, n-butanol, isopropanol, isobutanol, and t-butanol together with the dialkoxymagnesium (a). When using such a dialkoxymagnesium sample, the dialkoxymagnesium (a) and the alcohol (b) are suspended in the inert organic solvent so that the total amount of the alcohol included in the sample and the alcohol (b) that is separately added is within the above range.

A hydrocarbon compound is preferable as the inert organic solvent used to prepare the suspension of the dialkoxymagnesium (a) and the alcohol (b) when producing the solid catalyst component according to one embodiment of the invention. Specific examples of the hydrocarbon compound include an aliphatic hydrocarbon compound such as hexane, heptane, decane, 2,2-dimethylbutane, 2,3-dimethylbutane, and 2,2-dimethylhexane, an alicyclic hydrocarbon compound such as cyclopentane, cyclohexane, and methylcyclohexane, an aromatic hydrocarbon compound such as toluene, xylene, and ethylbenzene, and the like. Among these, hydrocarbon compounds having a boiling point of 70 to 150° C. are preferable, and heptane, decane, toluene, and xylene are more preferable.

The amount of the inert organic solvent in which the dialkoxymagnesium (a) and the alcohol (b) are suspended is not particularly limited. The inert organic solvent is preferably used in an amount of 1 to 100 ml, more preferably 1 to 50 ml, still more preferably 3 to 50 ml, and yet more preferably 3 to 10 ml, per g of the dialkoxymagnesium (a). When the amount of the inert organic solvent is within the above range, the viscosity of the suspension can be reduced.

The dialkoxymagnesium (a), the alcohol (b), and the inert organic solvent may be brought into contact with each other in an arbitrary order when preparing the suspension that includes the dialkoxymagnesium (a) and the alcohol (b). For example, (i) the dialkoxymagnesium (a) and the alcohol (b) may be brought into contact with each other, and the mixture may be brought into contact with the inert organic solvent, (ii) the dialkoxymagnesium (a) and the inert organic solvent may be brought into contact with each other, and the mixture may be brought into contact with the alcohol (b), or (iii) the alcohol (b) and the inert organic solvent may be brought into contact with each other, and the mixture may be brought into contact with the dialkoxymagnesium (a).

It is preferable to employ the contact order (ii) or (iii) since the alcohol (b) can be uniformly brought into contact with the dialkoxymagnesium (a).

The temperature employed when preparing the suspension is not particularly limited. It is preferable to bring the dialkoxymagnesium (a), the alcohol (b), and the inert organic solvent into contact with each other at a temperature equal to or less than the boiling point of the alcohol (b) and the boiling point of the inert organic solvent in order to suppress undue vaporization of the alcohol (b) and the inert organic solvent. It is preferable to bring the dialkoxymagnesium (a), the alcohol (b), and the inert organic solvent into contact with each other at 50° C. or less since breakage and a deterioration of the particles of the dialkoxymagnesium (a) can be suppressed.

It is preferable to maintain the resulting suspension at 20° C. or less.

The solid catalyst component according to one embodiment of the invention is produced by suspending the dialkoxymagnesium (a) and the alcohol (b) in the inert organic solvent, and bringing the internal electron donor (c) and the titanium halide compound (d) into contact with the suspension.

Examples of the internal electron donor (c) used to produce the solid catalyst component according to one embodiment of the invention include known compounds that are used to produce a solid catalyst component. For example, the internal electron donor (c) may be one or more compounds selected from an acid anhydride, an acid halide, a diether compound, an acid amide, a nitrile, an ether carbonate compound, an ester (e.g., monocarboxylic acid ester compound and dicarboxylic acid ester compound), an organic compound that includes an oxygen atom or a nitrogen atom, and the like.

Examples of a compound that is preferable as the internal electron donor (c) include a diether compound, an ether carbonate compound, a dicarboxylic acid ester compound, and the like.

Examples of the diether compound that may be used as the internal electron donor (c) include 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)1,3-dimethoxypropane, 9,9-bis(methoxymethyl)fluorene, and the like.

Examples of the ether carbonate compound include (2-ethoxyethyl)methyl carbonate, (2-ethoxyethyl)ethyl carbonate, (2-ethoxyethyl)phenyl carbonate, and the like.

Examples of the ester include a maleic acid diester, a malonic acid diester, an alkyl-substituted malonic acid diester, a halogen-substituted malonic acid diester, a dialkylmalonic acid diester such as dimethyl ethylcyclopentylmalonate, diethyl ethylcyclopentylmalonate, dimethyl diisobutylmalonate, and diethyl diisobutylmalonate, a benzylidenemalonic acid diester such as dimethyl benzylidenemalonate and diethyl benzylidenemalonate, a succinic acid diester, an alkyl-substituted succinic acid diester, a halogen-substituted succinic acid diester, a cycloalkanedicarboxylic acid ester, a cycloalkenecarboxylic acid diester, an aromatic dicarboxylic acid diester, and the like.

Examples of a preferable cycloalkanedicarboxylic acid ester include a compound having a cycloalkanedicarboxylic acid diester structure, such as di-n-butyl cyclohexanedicarboxylate, diisobutyl cyclohexanedicarboxylate, dihexyl cyclohexanedicarboxylate, diheptyl cyclohexanedicarboxylate, dioctyl cyclohexanedicarboxylate, di-2-ethylhexyl cyclohexanedicarboxylate, diisobutyl cyclopentanedicarboxylate, diheptyl cyclopentanedicarboxylate, diisobutyl cycloheptanedicarboxylate, and diheptyl cycloheptanedicarboxylate.

Examples of the cycloalkenecarboxylic acid diester include diethyl tetrahydrophthalate, dipropyl tetrahydrophthalate, diisopropyl tetrahydrophthalate, dibutyl tetrahydrophthalate, diisobutyl tetrahydrophthalate, and the like.

Examples of the aromatic dicarboxylic acid diester include a phthalic acid diester, an alkyl-substituted phthalic acid diester, a halogen-substituted phthalic acid diester, and the like. Specific examples of the aromatic dicarboxylic acid diester include diethyl phthalate, di-n-propyl phthalate, diisopropyl phthalate, di-n-butyl phthalate, diisobutyl phthalate, ethyl-n-propyl phthalate, ethylisopropyl phthalate, ethyl-n-butyl phthalate, ethylisobutyl phthalate, and the like.

The titanium halide compound (d) used to produce the solid catalyst component according to one embodiment of the invention may be one or more compounds selected from a titanium halide and an alkoxytitanium halide.

Examples of the titanium halide include a titanium tetrahalide such as titanium tetrachloride, titanium tetrabromide, and titanium tetraiodide, and the like.

Examples of the alkoxytitanium halide include methoxytitanium trichloride, ethoxytitanium trichloride, propoxytitanium trichloride, n-butoxytitanium trichloride, dimethoxytitanium dichloride, diethoxytitanium dichloride, dipropoxytitanium dichloride, di-n-butoxytitanium dichloride, trimethoxytitanium chloride, triethoxytitanium chloride, tripropoxytitanium chloride, tri-n-butoxytitanium chloride, and the like.

The solid catalyst component according to one embodiment of the invention may further include (e) a polysiloxane.

The polysiloxane (e) is a polymer that includes a siloxane linkage (—Si—O—Si— linkage) in the main chain, and is also referred to as "silicone oil". The polysiloxane (e) may be a chain-like, partially hydrogenated, cyclic, or modified polysiloxane.

Examples of the chain-like polysiloxane include dimethylpolysiloxane, methylphenylpolysiloxane, and the like. Examples of the partially hydrogenated polysiloxane include methyl hydrogen polysiloxane having a degree of hydrogenation of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, and the like. Examples of the modified polysiloxane include a higher fatty acid group-substituted dimethylsiloxane, an epoxy group-substituted dimethylsiloxane, a polyoxyalkylene group-substituted dimethylsiloxane, and the like.

Among these, decamethylcyclopentasiloxane and dimethylpolysiloxane are preferable, and decamethylcyclopentasiloxane is particularly preferable.

It is preferable that the polysiloxane (e) be liquid or viscous at room temperature. It is preferable that the polysiloxane (e) have a viscosity at 25° C. of 0.02 to 100 cm$^2$/s (2 to 10,000 cSt), more preferably 0.02 to 5 cm$^2$/s (2 to 500 cSt), and still more preferably 0.03 to 5 cm$^2$/s (3 to 500 cSt).

When the solid catalyst component according to one embodiment of the invention includes the polysiloxane (e), the stereoregularity or the crystallinity of a polymer obtained using an olefin polymerization catalyst that includes the solid catalyst component can be improved. It is also possible to reduce the fine particle content in the resulting polymer.

The polysiloxane (e) may be brought into contact with the suspension together with the internal electron donor (c) or the titanium halide compound (d), or may be brought into contact with the suspension separately from the internal electron donor (c) or the titanium halide compound (d).

The solid catalyst component according to one embodiment of the invention is produced by bringing the internal electron donor (c) and the titanium halide compound (d) into contact with the suspension obtained by suspending the dialkoxymagnesium (a) and the alcohol (b) in the inert organic solvent.

It is preferable to bring the internal electron donor (c) and the titanium halide compound (d) into contact with the suspension with stirring in a vessel equipped with a stirrer that contains an inert gas atmosphere from which water and the like have been removed. The performance of the solid catalyst component can be improved by bringing the internal electron donor (c), or the internal electron donor (c) and the titanium halide compound (d), into contact with the suspension a plurality of times.

It is preferable to bring the internal electron donor (c) and the titanium halide compound (d) into contact with the suspension in the presence of an inert organic solvent.

The internal electron donor (c) is preferably used in an amount of 0.3 mol or less, more preferably 0.03 to 0.3 mol, and still more preferably 0.06 to 0.3 mol, per mol of the dialkoxymagnesium (a).

When the amount of the internal electron donor (c) per mol of the dialkoxymagnesium (a) is within the above range, it is possible to improve the balance between the polymerization activity of the solid catalyst and the stereoregularity of the resulting polymer when polymerizing an olefin using the solid catalyst component according to one embodiment of the invention.

The titanium halide compound (d) is preferably used in an amount of 0.5 to 100 mol, more preferably 0.5 to 50 mol, still more preferably 1 to 50 mol, and yet more preferably 1 to 10 mol, per mol of the dialkoxymagnesium (a).

When the amount of the titanium halide compound (d) per mol of the dialkoxymagnesium (a) is within the above range, the dialkoxymagnesium is smoothly halogenated. Moreover, since titanium that is necessary for formation of an active site is supplied, a solid catalyst component with high polymerization activity when used for an olefin polymerization catalyst can be obtained.

The internal electron donor (c) and the titanium halide compound (d) may be brought into contact with the suspension at an arbitrary temperature. When merely bringing the internal electron donor (c) and the titanium halide compound (d) into contact with the suspension, and stirring the mixture, or dispersing or suspending the internal electron donor (c) and the titanium halide compound (d) to effect a modification treatment, the internal electron donor (c) and the titanium halide compound (d) may be brought into contact with the suspension at a relatively low temperature around room temperature. When bringing the internal electron donor (c) and the titanium halide compound (d) into contact with the suspension, and reacting the components to obtain a product, it is preferable to bring the internal electron donor (c) and the titanium halide compound (d) into contact with the suspension at 40 to 130° C., more preferably 60 to 130° C., still more preferably 60 to 120° C., and yet more preferably 80 to 120° C.

When the internal electron donor (c) and the titanium halide compound (d) are brought into contact with the suspension at 40 to 130° C., it is possible to suppress undue vaporization of the solvent while ensuring that the reaction sufficiently proceeds.

It is preferable to bring the internal electron donor (c) and the titanium halide compound (d) into contact with the suspension for 1 minute or more, more preferably 10 minutes or more, and still more preferably 30 minutes or more.

It is preferable that the solid catalyst component according to one embodiment of the invention have a titanium atom content of 0.1 to 20 mass %, more preferably 0.1 to 10 mass %, and still more preferably 1.0 to 10 mass %.

It is preferable that the solid catalyst component according to one embodiment of the invention have a magnesium atom content of 10 to 25 mass %, more preferably 15 to 25 mass %, and still more preferably 20 to 25 mass %.

It is preferable that the solid catalyst component according to one embodiment of the invention have a halogen atom content of 20 to 75 mass %, more preferably 30 to 75 mass %, still more preferably 40 to 75 mass %, and particularly preferably 45 to 75 mass %.

It is preferable that the solid catalyst component according to one embodiment of the invention have a content of the internal electron donor (c) (internal electron donor content) of 0.5 to 30 mass %, more preferably 1 to 30 mass %, still more preferably 1 to 25 mass %, still more preferably 2 to 25 mass %, and yet more preferably 2 to 20 mass %.

Note that the titanium atom content and the magnesium atom content in the solid catalyst component refer to values measured in accordance with the method (oxidation-reduction titration) specified in JIS 8311-1997 ("Method for determination of titanium in titanium ores"). The halogen atom content in the solid catalyst component refers to a value obtained by treating the solid catalyst component using a mixture of sulfuric acid and purified water to obtain an aqueous solution, preparatively isolating a given amount of the aqueous solution, and titrating halogen atoms with a silver nitrate standard solution (silver nitrate titration method). The internal electron donor content in the solid catalyst component refers to a value obtained by hydrolyzing the solid catalyst component, extracting the internal electron donor using an aromatic solvent, and analyzing the solution using a gas chromatography-flame ionization detector (FID) method.

The solid catalyst component according to one embodiment of the invention is characterized by being produced (specified) by the above specific production method. The solid catalyst component according to one embodiment of the invention can suitably be produced by the above specific production method.

The solid catalyst component according to one embodiment of the invention makes it possible to provide a solid catalyst component for olefin polymerization that makes it possible to polymerize an olefin with high polymerization activity when used for an olefin polymerization catalyst, and produce an olefin polymer having a low fine powder content, a low coarse powder content, and a low volatile organic compound (VOC) content in high yield.

Note that the catalytic activity of the polymerization catalyst, the particle size distribution (including the fine powder content and the coarse powder content) of the resulting polymer, and the volatile organic compound (VOC) content in the resulting polymer refer to values measured using the methods described later.

An olefin polymerization catalyst according to one embodiment of the invention is described below.

The olefin polymerization catalyst according to one embodiment of the invention includes:

(α) the solid catalyst component for olefin polymerization according to one embodiment of the invention;

(β) an organoaluminum compound represented by the following general formula (I),

wherein $R^1$ is a hydrocarbyl group having 1 to 6 carbon atoms, provided that a plurality of $R^1$ are either identical or different when a plurality of $R^1$ are present, Q is a hydrogen atom, a hydrocarbyloxy group having 1 to 6 carbon atoms, or a halogen atom, provided that a plurality of Q are either identical or different when a plurality of Q are present, and p is a real number that satisfies 0<p≤3; and (γ) an external electron donor compound.

The details of the solid catalyst component (α) for olefin polymerization according to one embodiment of the invention included in the olefin polymerization catalyst according to one embodiment of the invention are the same as described above.

The olefin polymerization catalyst according to one embodiment of the invention includes the organoaluminum compound (β) represented by the following general formula (I).

wherein $R^1$ is a hydrocarbyl group having 1 to 6 carbon atoms, provided that a plurality of $R^1$ are either identical or different when a plurality of $R^1$ are present, Q is a hydrogen atom, a hydrocarbyloxy group having 1 to 6 carbon atoms, or a halogen atom, provided that a plurality of Q are either identical or different when a plurality of Q are present, and p is a real number that satisfies 0<p≤3.

$R^1$ in the organoaluminum compound represented by the general formula (I) is preferably an ethyl group, an isobutyl group, or the like. Q is preferably a hydrogen atom, a chlorine atom, a bromine atom, an ethoxy group, or a phenoxy group, and p is preferably 2, 2.5, or 3, and particularly preferably 3.

Specific examples of the organoaluminum compound include a trialkylaluminum such as triethylaluminum, triisopropylaluminum, tri-n-butylaluminum, and triisobutylaluminum, an alkylaluminum halide such as diethylaluminum chloride and diethylaluminum bromide, an alkylaluminum hydride such as diethylaluminum hydride and diisobutylaluminum hydride, and an alkylaluminum alkoxide such as diethylaluminum ethoxide and diethylaluminum phenoxide. Among these, an alkylaluminum halide such as diethylaluminum chloride, and a trialkylaluminum such as triethylaluminum, tri-n-butylaluminum, and triisobutylaluminum are preferable, and triethylaluminum and triisobutylaluminum are more preferable. These aluminum compounds may be used either alone or in combination.

When the olefin polymerization catalyst according to one embodiment of the invention includes the organoaluminum compound represented by the general formula (I), some of the internal electron donors are extracted, and the external electron donor compound is easily inserted. It is also possible to preliminarily activate the solid catalyst component.

The olefin polymerization catalyst according to one embodiment of the invention includes the solid catalyst component (α) according to one embodiment of the invention, the organoaluminum compound (β) represented by the general formula (I), and the external electron donor compound (γ).

Examples of the external electron donor compound (γ) included in the olefin polymerization catalyst according to one embodiment of the invention include organic compounds that include an oxygen atom or a nitrogen atom. Examples of the organic compounds that include an oxygen atom or a nitrogen atom include an alcohol, a phenol, an ether, an ester, a ketone, an acid halide, an aldehyde, an amine, an amide, a nitrile, an isocyanate, and an organosilicon compound. The external electron donor compound (γ) may be one or more compounds selected from an organosilicon compound that includes an Si—O—C linkage, an aminosilane compound that includes an Si—N—C linkage, and a diether.

Among these, an ester such as ethyl benzoate, ethyl p-methoxybenzoate, ethyl p-ethoxybenzoate, methyl p-toluate, ethyl p-toluate, methyl anisate, and ethyl anisate, an organosilicon compound that includes an Si—O—C linkage, an aminosilane compound that includes an Si—N—C linkage, and a 2-substituted 1,3-diether compound are preferable. The external electron donor compound (γ) is particularly preferably at least one compound selected from an organosilicon compound that includes an Si—O—C linkage, an aminosilane compound that includes an Si—N—C linkage, and a 2-substituted 1,3-diether compound.

Examples of the organosilicon compound that includes an Si—O—C linkage include an organosilicon compound represented by the following general formula (II).

wherein $R^2$ is an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 15 carbon atoms, or a substituted aromatic hydrocarbon group having 6 to 15 carbon atoms, provided that a plurality of $R^2$ are either identical or different when a plurality of $R^2$ are present, $R^3$ is an alkyl group having 1 to 4 carbon atoms, a vinyl group, an alkenyl group having 3 to 12 carbon atoms, a cycloalkyl group having 3 to 6 carbon atoms, an aromatic hydrocarbon group having 6 to 12 carbon atoms, or a substituted aromatic hydrocarbon group having 7 to 12 carbon atoms, provided that a plurality of $R^3$ are either identical or different when a plurality of $R^3$ are present, and q is an integer from 0 to 3.

Examples of the aminosilane compound that includes an Si—N—C linkage include an aminosilane compound represented by the following general formula (III).

$$(R^4R^5N)_sSiR^6_{4-s} \qquad (III)$$

wherein $R^4$ and $R^5$ are a hydrogen atom, an alkyl group having 1 to 20 carbon atoms, a vinyl group, an alkenyl group having 3 to 20 carbon atoms, a cycloalkyl group having 3 to 20 carbon atoms, a cycloalkenyl group having 3 to 20 carbon atoms, or an aryl group having 6 to 20 carbon atoms, provided that $R^4$ and $R^5$ that form the $R^4R^5N$ group are either identical or different, and optionally bond to each other to form a ring, a plurality of $R^4R^5N$ groups are either identical or different when a plurality of $R^4R^5N$ groups are present, $R^6$ is an alkyl group having 1 to 20 carbon atoms, a vinyl group, an alkenyl group having 3 to 12 carbon atoms, an alkoxy group having 1 to 20 carbon atoms, a vinyloxy group, an alkenyloxy group having 3 to 20 carbon atoms, a cycloalkyl group having 3 to 20 carbon atoms, a cycloalkyloxy group having 3 to 20 carbon atoms, an aryl group having 6 to 20 carbon atoms, or an aryloxy group having 6 to 20 carbon atoms, provided that a plurality of $R^6$ are either identical or different when a plurality of $R^6$ are present, and s is an integer from 1 to 3.

Examples of the organosilicon compound and the aminosilane compound include a phenylalkoxysilane, an alkylalkoxysilane, a phenylalkylalkoxysilane, a cycloalkylalkoxysilane, an alkyl(cycloalkyl)alkoxysilane, an (alkylamino) alkoxysilane, an alkyl(alkylamino)alkoxysilane, a cycloalkyl(alkylamino)alkoxysilane, a tetraalkoxysilane, a tetrakis(alkylamino)silane, an alkyltris(alkylamino)silane, a dialkylbis(alkylamino)silane, a trialkyl(alkylamino)silane, and the like. Specific examples of the organosilicon compound and the aminosilane compound include phenyltrimethoxysilane, t-butyltrimethoxysilane, diisopropyldimethoxysilane, isopropylisobutyldimethoxysilane, diisopentyldimethoxysilane, bis(2-ethylhexyl)dimethoxysilane, t-butylmethyldimethoxysilane, t-butylethyldimethoxysilane, dicyclopentyldimethoxysilane, dicyclohexyldimethoxysilane, cyclohexylcyclopentyldimethoxysilane, cyclohexylmethyldimethoxysilane, tetraethoxysilane, tetrabutoxysilane, bis(ethylamino)methylethylsilane, t-butylmethylbis(ethylamino)silane, bis(ethylamino)dicyclohexylsilane, dicyclopentylbis(ethylamino)silane, bis(methylamino)(methylcyclopentylamino)methylsilane, diethylaminotriethoxysilane, bis(cyclohexylamino)dimethoxysilane, bis(perhydroisoquinolino)dimethoxysilane, bis(perhydroquinolino)dimethoxysilane, ethyl(isoquinolino)dimethoxysilane, diethylaminotrimethoxysilane, diethylaminotriethoxysilane, trimethylsilyltrimethoxysilane, trimethylsilyltriethoxysilane, and the like. Among these, phenyltrimethoxysilane, t-butylmethyldimethoxysilane, t-butylethyldimethoxysilane, diisopropyldimethoxysilane, isopropylisobutyldimethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethylamino)dicyclohexylsilane, dicyclopentylbis(ethylamino)silane, bis(perhydroisoquinolino)dimethoxysilane, diethylaminotrimethoxysilane, diethylaminotriethoxysilane, and the like are preferable.

The organosilicon compound may be one or more compounds selected from the organosilicon compound represented by the general formula (II), and one or more compounds selected from the aminosilane compound represented by the general formula (III).

The 2-substituted 1,3-diether compound is preferably one or more compounds selected from a diether compound represented by the following general formula (IV).

$$R^7OCH_2CR^8R^9CH_2OR^{10} \qquad (IV)$$

wherein $R^8$ and $R^9$ are a hydrogen atom, a halogen atom, an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a halogen-substituted aromatic hydrocarbon group having 6 to 12 carbon atoms, a substituted aromatic hydrocarbon group having 7 to 12 carbon atoms, an alkylamino group having 1 to 12 carbon atoms, or a dialkylamino group having 2 to 12 carbon atoms, provided that $R^8$ and $R^9$ are either identical or different, and optionally bond to each other to form a ring, and $R^7$ and $R^{10}$ are an alkyl group having 1 to 12 carbon atoms, a vinyl group, an alkenyl group having 3 to 12 carbon atoms, a cycloalkyl group having 3 to 6 carbon atoms, an aromatic hydrocarbon group having 6 to 12 carbon atoms, a halogen-substituted aromatic hydrocarbon group having 6 to 12 carbon atoms, or a substituted aromatic hydrocarbon group having 7 to 12 carbon atoms, provided that $R^7$ and $R^{10}$ are either identical or different.

Specific examples of the 2-substituted 1,3-diether include 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane, 9,9-bis(methoxymethyl)fluorene, and the like. Among these, 2-isopropyl-2-isobutyl-1,3-dimethoxypropane, 9,9-bis(methoxymethyl)fluorene, and the like are preferable.

The olefin polymerization catalyst according to one embodiment of the invention may include two or more compounds selected from the organosilicon compound represented by the general formula (II), the aminosilane compound represented by the general formula (III), and the diether compound represented by the general formula (IV).

The olefin polymerization catalyst according to one embodiment of the invention may include the solid catalyst component (α) according to one embodiment of the invention, the organoaluminum compound (β) represented by the general formula (I), and the external electron donor compound (γ) in an arbitrary ratio. It is preferable that the olefin polymerization catalyst according to one embodiment of the invention include the organoaluminum compound (β) represented by the general formula (I) in an amount of 1 to 2000 mol, more preferably 50 to 2000 mol, still more preferably 50 to 1000 mol, and yet more preferably 10 to 1000 mol, per mol of the solid catalyst component (α) according to one embodiment of the invention.

It is preferable that the olefin polymerization catalyst according to one embodiment of the invention include the external electron donor compound (γ) in an amount of 0.002 to 10 mol, more preferably 0.002 to 2 mol, still more preferably 0.01 to 2 mol, and yet more preferably 0.01 to 0.5 mol, per mol of the organoaluminum compound (β) represented by the general formula (I).

The olefin polymerization catalyst according to one embodiment of the invention may include the solid catalyst component (α) according to one embodiment of the invention, the organoaluminum compound (β) represented by the general formula (I), and the external electron donor compound (γ) that are mixed in advance in the desired ratio, or may be prepared by mixing the solid catalyst component (α) according to one embodiment of the invention, the organoaluminum compound (β) represented by the general formula (I), and the external electron donor compound (γ) before use.

The olefin polymerization catalyst according to one embodiment of the invention that includes the solid catalyst component (α) according to one embodiment of the invention, the organoaluminum compound (β) represented by the general formula (I), and the external electron donor compound (γ) makes it possible to produce a polymer that exhibits excellent stereoregularity while achieving excellent polymerization activity in a well-balanced manner.

The olefin polymerization catalyst according to one embodiment of the invention may be easily prepared by mixing the solid catalyst component (α) according to one embodiment of the invention, the organoaluminum compound (β)represented by the general formula (I), and the external electron donor compound (γ) in the desired ratio.

The embodiments of the invention can thus provide an olefin polymerization catalyst that makes it possible to polymerize an olefin with high polymerization activity, and produce an olefin polymer having a low fine powder content, a low coarse powder content, and a low volatile organic compound (VOC) content in high yield, and a method for producing an olefin polymer using the olefin polymerization catalyst.

A method for producing an olefin polymer according to one embodiment of the invention is described below.

The method for producing an olefin polymer according to one embodiment of the invention includes polymerizing an olefin in the presence of the olefin polymerization catalyst according to one embodiment of the invention.

The details of the olefin polymerization catalyst according to one embodiment of the invention used for the method for producing an olefin polymer according to one embodiment of the invention are the same as described above.

The olefin that is polymerized using the method for producing an olefin polymer according to one embodiment of the invention may be one or more olefins selected from ethylene, propylene, 1-butene, 1-pentene, 4-methyl-1-pentene, vinylcyclohexane, and the like. Among these, ethylene, propylene, and 1-butene are preferable, and propylene is more preferable.

The method for producing an olefin polymer according to one embodiment of the invention can also produce a copolymer using a plurality of types of olefins. In this case, the plurality of types of olefins may be propylene, and one or more olefins selected from ethylene, 1-butene, 1-pentene, 4-methyl-l-pentene, vinylcyclohexane, and the like. It is preferable that the plurality of types of olefins be a combination of propylene and one or more olefins selected from ethylene and 1-butene.

When implementing the method for producing an olefin polymer according to one embodiment of the invention, it is preferable to add the desired amount of the organoaluminum compound (β) represented by the general formula (I) to a polymerization system that includes the polymerization target olefin, add the desired amount of the external electron donor compound (γ) to the polymerization system, and then add the desired amount of the solid catalyst component (α) according to one embodiment of the invention to the polymerization system.

When implementing the method for producing an olefin polymer according to one embodiment of the invention, the olefin may be polymerized in the presence or absence of an organic solvent. The olefin such as propylene may be used either in a gaseous state or a liquid state.

When implementing the method for producing an olefin polymer according to one embodiment of the invention, the polymerization temperature is preferably 200° C. or less, and more preferably 100° C. or less, and the polymerization pressure is preferably 10 MPa or less, and more preferably 5 MPa or less.

The polymerization reaction may be effected using a continuous polymerization method or a batch polymerization method. The polymerization reaction may be effected in one step, or may be effected in two or more steps.

When implementing the method for producing an olefin polymer according to one embodiment of the invention, the olefin may be subjected to preliminary polymerization using some or all of the components of the olefin polymerization catalyst according to one embodiment of the invention before polymerizing the olefin using the olefin polymerization catalyst that includes the solid catalyst component (α) according to one embodiment of the invention, the organoaluminum compound (β) represented by the general formula (I), and the external electron donor compound (γ) (hereinafter referred to as "main polymerization").

When effecting the preliminary polymerization, part or the entirety of the olefin subjected to the main polymerization may be polymerized.

When effecting the preliminary polymerization, the components of the olefin polymerization catalyst and the olefin may be brought into contact with each other in an arbitrary order. It is preferable to add the organoaluminum compound (β) represented by the general formula (I) to a preliminary polymerization system that contains an inert gas atmosphere or an olefin gas atmosphere, add the solid catalyst component (α) according to one embodiment of the invention to the preliminary polymerization system, and then add one or more olefins (e.g., propylene) to the preliminary polymerization system.

When effecting the preliminary polymerization using the external electron donor compound (γ), it is preferable to add the organoaluminum compound (β) represented by the general formula (I) to the preliminary polymerization system that contains an inert gas atmosphere or an olefin gas atmosphere, add the external electron donor compound (γ) to the preliminary polymerization system, add the solid catalyst component (α) according to one embodiment of the invention to the preliminary polymerization system, and then add one or more olefins (e.g., propylene) to the preliminary polymerization system.

It is possible to improve the catalytic activity, and easily produce a polymer that exhibits excellent stereoregularity and particle properties by effecting the preliminary polymerization.

When producing a block copolymer such as a propylene block copolymer, two or more polymerization steps are performed. Specifically, an olefin such as propylene is normally polymerized in the first step in the presence of the polymerization catalyst, and another olefin such as ethylene and propylene are copolymerized in the second step.

For example, when an olefin such as propylene is polymerized in the first step, an α-olefin other than propylene may be copolymerized or homopolymerized in the second or subsequent step. Examples of the α-olefin include ethylene, 1-butene, 4-methyl-1-pentene, vinylcyclohexane, 1-hexene, 1-octene, and the like.

Specifically, the polymerization temperature and the polymerization time in the first step are adjusted so that the content of a polypropylene part is 20 to 80 mass %. In the second step, ethylene and propylene or another a-olefin are introduced, and polymerized so that the content of a rubber part (e.g., ethylene-propylene rubber (EPR)) is 20 to 80 mass %.

When producing a block copolymer, the polymerization temperature in the first step and the second step is preferably 200° C. or less, and more preferably 100° C. or less. When producing a block copolymer, the polymerization pressure is preferably 10 MPa or less, and more preferably 5 MPa or less.

The polymerization time in each polymerization step (or the residence time when effecting continuous polymerization) is preferably 1 minute to 5 hours.

Examples of the polymerization method include a slurry polymerization method that utilizes an inert hydrocarbon solvent such as cyclohexane or heptane, a bulk polymerization method that utilizes a solvent such as liquefied propylene, and a vapor-phase polymerization method in which a solvent is not substantially used. The bulk polymerization method and the vapor-phase polymerization method are preferable as the polymerization method.

The method for producing an olefin polymer according to one embodiment of the invention that utilizes the olefin polymerization catalyst that includes the solid catalyst component according to one embodiment of the invention can polymerize an olefin with high polymerization activity, and produce an olefin polymer having a low fine powder content, a low coarse powder content, and a low volatile organic compound (VOC) content in high yield.

EXAMPLES

The invention is further described below by way of examples and comparative examples. Note that the invention is not limited to the following examples.

Example 1

(1) Production of Solid Catalyst Component

A 500 ml round-bottom flask equipped with a stirrer, in which the internal atmosphere had been sufficiently replaced by nitrogen gas, was charged with 70 ml of titanium tetrachloride and 50 ml of toluene to prepare a solution, which was maintained at −10° C. A 200 ml round-bottom flask equipped with a stirrer, in which the internal atmosphere had been sufficiently replaced by nitrogen gas, was charged with 20 g of diethoxymagnesium (average particle size: 57 μm, bulk density: 0.33 g/ml, ethanol content: 0 mass %), 70 ml toluene, and 0.25 ml of ethanol (1.0 part by mass based on 100 parts by mass of diethoxymagnesium) to prepare a suspension, followed by the addition of 26.3 mmol (7.0 ml) of di-n-butyl phthalate.

The entire suspension was added to the solution maintained at −10° C. The temperature inside the flask was increased from −10° C. to 110° C., and the mixture was reacted at 110° C. for 3 hours with stirring. After completion of the reaction, the resulting solid product was washed four times with 167 ml of toluene (100° C.). After the addition of 123 ml of toluene (room temperature) and 20 ml of titanium tetrachloride, the mixture was heated to 110° C., and reacted for 2 hours with stirring. After completion of the reaction, the supernatant liquid was removed, and the residue was washed eight times with 125 ml of n-heptane (40° C.) to obtain the target solid catalyst component.

The solid catalyst component had a titanium atom content of 2.8 mass %, a magnesium atom content of 18.4 mass %, a halogen atom content of 61.4 mass %, and a total internal electron donor content of 13.0 mass %.

In the examples and comparative examples, the ethanol content in diethoxymagnesium refers to a value measured using the following method. Measurement of ethanol content in diethoxymagnesium A 100 ml recovery flask in which the internal atmosphere had been replaced by nitrogen, and which was weighed in advance in an empty state, was charged with about 10 g of diethoxymagnesium in a nitrogen atmosphere, and the weight M (g) thereof was recorded. After drying the diethoxymagnesium at room temperature for 1 hour under reduced pressure using a vacuum pump ("G-100D" manufactured by ULVAC Ltd.), the diethoxymagnesium was heated to 50° C., and dried at 50° C. for 2 hours under reduced pressure. After cooling the diethoxymagnesium to room temperature, the pressure inside the recovery flask was returned to normal pressure using nitrogen gas, and the weight N(g) of the resulting product that was dried under reduced pressure was measured. The alcohol content in the diethoxymagnesium was calculated using the following expression.

Alcohol content (mass %) in diethoxymagnesium= [{$M$(g)−$N$(g)}/$M$(g)]×100

(2) Preparation of Olefin Polymerization Catalyst 1a

An autoclave (internal volume: 2.01 ) equipped with a stirrer, in which the internal atmosphere had been completely replaced by nitrogen gas, was charged with 1.32 mmol of triethylaluminum, 0.13 mmol of cyclohexylmethyldimethoxysilane, and the solid catalyst component (see (1)) (0.0026 mmol on a titanium atom basis) to prepare an olefin polymerization catalyst 1a.

(3) Production of Polypropylene

The autoclave equipped with a stirrer and charged with the olefin polymerization catalyst 1a (see (2)) was charged with 2.0 l of hydrogen gas and 1.4 l of liquefied propylene. The liquefied propylene was subjected to preliminary polymerization at 20° C. for 5 minutes, heated, and polymerized at 70° C. for 1 hour to produce a polymer (polypropylene).

The polymerization activity per gram of the solid catalyst component, the xylene-soluble content (XS) in the resulting polymer, the MFR and the average particle size of the polymer, the fine powder content and the coarse powder content in the polymer, the particle size distribution index (SPAN) and the bulk density of the polymer were measured as described below. The results are shown in Table 1.

Polymerization Activity Per Gram of Solid Catalyst Component

The polymerization activity per gram of the solid catalyst component was calculated using the following expression.

Polymerization activity (g–pp/g–catalyst)=mass (g) of polymer/mass (g) of solid catalyst component included in olefin polymerization catalyst Xylene-Soluble Content (XS) (Mass %) in Polymer A flask equipped with a stirrer was charged with 4.0 g of the polymer and 200 ml of p-xylene. The external temperature was increased to be equal to or higher than the boiling point (about 150° C.) of xylene, and the polymer was dissolved over 2 hours while maintaining p-xylene contained in the flask at a temperature (137 to 138° C.) under the condition of boiling point. The solution was then cooled to 23° C., and an insoluble component and a soluble component were separated by filtration. A solution of the soluble component was collected, and p-xylene was evaporated by heating and drying under reduced pressure. The mass of the residue (xylene-soluble component) was calculated as a value (wt %) relative to the mass of the polymer (polypropylene), and taken as the xylene-soluble content (XS).

Melt Flow Rate (MFR) of Polymer

The melt flow rate (MFR) (melt flow index) of the polymer was measured in accordance with ASTM D 1238 (JIS K 7210).

Particle Size Distribution, Fine Powder Content, Coarse Powder Content, Average Particle Size, and Particle Size Distribution Index of Polymer The volumetric cumulative particle size distribution of the polymer was automatically measured under the following measurement conditions using a digital image analysis particle size distribution analyzer ("Camsizer" manufactured by Horiba Ltd.) to determine the fine powder content (particle size: smaller than 75 μm) (wt %), the coarse powder content (particle size: larger than 2800 μm) (wt %), and the particle size distribution index (SPAN).

Measurement Conditions

Funnel position: 6 mm
Cover area of camera: basic camera: less than 3%, zoom camera: less than 10%
Target cover area: 0.5%
Feeder width: 40 mm
Feeder control level: 57 and 40 sec
Measurement start level: 47
Maximum control level: 80
Control standard: 20
Image rate: 50% (1:2)
Definition of particle size: minimum value of Martin diameter of each particle measured n times
SPHT (sphericity) fitting: 1
Class upper limit: 50 points were selected within the range of 32 to 4000 μm (logarithmic scale)

The particle size distribution index (SPAN) was calculated using the following expression.

Particle size distribution index (SPAN)=(particle size at 90% in volumetric cumulative particle size distribution−particle size at 10% in volumetric cumulative particle size distribution)/(particle size at 50% in volumetric cumulative particle size distribution)

Bulk Density (BD)

The bulk density (BD) of the polymer was measured in accordance with JIS K 6721.

(4) Preparation of Olefin Polymerization Catalyst (ethylene-propylene Copolymerization Catalyst) 1b An autoclave (internal volume: 2.0 l) equipped with a stirrer, in which the internal atmosphere had been completely replaced by nitrogen gas, was charged with 2.4 mmol of triethylaluminum, 0.24 mmol of cyclohexylmethyldimethoxysilane, and the solid catalyst component (see (1)) (0.003 mmol on a titanium atom basis) to prepare an olefin polymerization catalyst (ethylene-propylene copolymerization catalyst) 1b.

(5) Production of ethylene-propylene Copolymer

The autoclave equipped with a stirrer and containing the olefin (ethylene-propylene) copolymerization catalyst 1b (see (4)) was charged with liquefied propylene (15 mol) and hydrogen gas (partial pressure: 0.20 MPa). The liquefied propylene was subjected to preliminary polymerization at 20° C. for 5 minutes, and subjected to first-step homopropylene (homo-PP) polymerization at 70° C. for 75 minutes. The pressure inside the autoclave was returned to normal pressure. After replacing the internal atmosphere in the autoclave by nitrogen gas, the mass of the autoclave was measured, and the tare mass of the autoclave was subtracted from the measured mass to calculate the homo-step (first-step) polymerization activity.

Note that the part of the resulting polymer was isolated preparatively for evaluating the polymerization performance and the homo-step polymer performance (MFR and BD). The polymer had an MFR of 30 g/10 min and a BD of 0.39.

After feeding ethylene, propylene, and hydrogen to the autoclave in a molar ratio of 1.0/1.0/0.043, the mixture was heated to 70° C., and reacted at 70° C. for 1 hour under a pressure of 1.2 MPa while feeding ethylene, propylene, and hydrogen in a ratio of 2/2/0.086 (l/min) to obtain an ethylene-propylene copolymer.

The copolymerization (ICP) activity (g–ICP/(g–cat·hr)), the block ratio (mass %) of the ethylene-propylene copolymer, and the VOC content (mass ppm) in the ethylene-propylene copolymer were measured as described below. The results are shown in Table 2.

Ethylene Propylene Block Copolymerization Activity (g–ICP/(g–cat·hr))

The ethylene-propylene block copolymerization (ICP) activity when producing the ethylene-propylene block copolymer, and the block ratio of the resulting copolymer were calculated using the following expressions.

Copolymerization (ICP) activity (g–ICP/(g–cat·hr))= ((I(g)−G(g))/mass(g) of solid catalyst component included in olefin polymerization catalyst)/ 1.0 (hr)

Note that I is the mass (g) of the autoclave after completion of copolymerization, and G is the mass (g) of the autoclave after unreacted monomers had been removed after completion of homo-PP polymerization.

Block Ratio (Mass %)

Block ratio (mass %)={(I(g)−G(g))/(I(g)−F(g))}×100

Note that I is the mass (g) of the autoclave after completion of copolymerization, G is the mass (g) of the autoclave after unreacted monomers had been removed after completion of homo-PP polymerization, and F is the mass (g) of the autoclave.

Measurement of VOC Content

The copolymer obtained by the copolymerization reaction was air-dried at room temperature for 12 hours, and 200 g of the copolymer was isolated preparatively. An autoclave (internal volume: 2l) was charged with the copolymer, and the copolymer was dried at 70° C. for 2 hours under reduced pressure using a vacuum pump ("G-100D" manufactured by ULVAC Ltd., degree of vacuum reached: $10^{-3}$ Torr). The inside of the autoclave was pressurized to 0.5 MPa using propylene gas, and decompressed to 0.1 MPa. This operation was performed 3 times in total. The inside of the autoclave was pressurized to 0.8 MPa using propylene gas, heated to 70° C., and maintained at 70° C. for 1 hour. After decompressing the inside of the autoclave to atmospheric pressure over 3 minutes, the entirety of the polymer was put in a flask within 5 minutes, and mass P (g) of the polymer including a VOC component was measured.

The polymer was dried using a rotary evaporator while heating the flask at 70° C. The mass of the flask was measured every 3 hours. When the mass of the flask reached a constant mass, the mass S (g) of the dried polymer was recorded.

The VOC content per g of the polymer was calculated using the following expression.

VOC content (mass ppm) per g of polymer=[{$P$(g)−$S$(g)}/200(g)]×1,000,000

Example 2

A solid catalyst component was produced in the same manner as in Example 1, except that 6.1 ml (26.3 mmol) of di-n-propyl phthalate was used instead of 7.0 ml of di-n-butyl phthalate (see "(1) Preparation of solid catalyst component"). The solid catalyst component had a titanium atom content of 2.5 mass %, a magnesium atom content of 19.1 mass %, a halogen atom content of 62.8 mass %, and a total internal electron donor content of 12.2 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 3

A solid catalyst component was produced in the same manner as in Example 1, except that the amount of ethanol was changed to 0.33 ml (1.3 parts by mass based on 100 parts by mass of diethoxymagnesium) (see "(1) Preparation of solid catalyst component"). The solid catalyst component had a titanium atom content of 3.2 mass %, a magnesium atom content of 19.0 mass %, a halogen atom content of 62.6 mass %, and a total internal electron donor content of 12.3 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 4

A solid catalyst component was produced in the same manner as in Example 1, except that the amount of ethanol was changed to 0.13 ml (0.5 parts by mass based on 100 parts by mass of diethoxymagnesium) (see "(1) Preparation of solid catalyst component"). The solid catalyst component had a titanium atom content of 2.8 mass %, a magnesium atom content of 18.8 mass %, a halogen atom content of 60.0 mass %, and a total internal electron donor content of 13.0 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 5

A solid catalyst component was produced in the same manner as in Example 1, except that 5.4 ml (26.3 mmol) of diethyl phthalate was used instead of 7.0 ml of di-n-butyl phthalate (see "(1) Preparation of solid catalyst component"). The solid catalyst component had a titanium atom content of 2.8 mass %, a magnesium atom content of 18.8 mass %, a halogen atom content of 60.4 mass %, and a total internal electron donor content of 13.9 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 6

A solid catalyst component was produced in the same manner as in Example 1, except that 6.4 ml (26.3 mmol) of dimethyl diisobutylmalonate was used instead of 7.0 ml of di-n-butyl phthalate (see "(1) Preparation of solid catalyst component"). The solid catalyst component had a titanium atom content of 3.0 mass %, a magnesium atom content of 17.9 mass %, a halogen atom content of 60.9 mass %, and a total internal electron donor content of 14.9 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 7

A solid catalyst component was produced in the same manner as in Example 1, except that 7.5 ml (26.3 mmol) of diethyl diisobutylmalonate was used instead of 7.0 ml of di-n-butyl phthalate (see "(1) Preparation of solid catalyst component"). The solid catalyst component had a titanium atom content of 3.2 mass %, a magnesium atom content of 17.8 mass %, a halogen atom content of 61.2 mass %, and a total internal electron donor content of 14.5 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 8

A solid catalyst component was produced in the same manner as in Example 1, except that 7.1 ml (26.3 mmol) of diisobutyl phthalate was used instead of 7.0 ml of di-n-butyl phthalate (see "(1) Preparation of solid catalyst component"). The solid catalyst component had a titanium atom content of 2.8 mass %, a magnesium atom content of 18.3 mass %, a halogen atom content of 61.2 mass %, and a total internal electron donor content of 12.9 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 9

A solid catalyst component was produced in the same manner as in Example 1, except that 0.26 ml (1.0 part by mass based on 100 parts by mass of diethoxymagnesium) of isopropanol was used instead of 0.25 ml of ethanol (see "(1) Preparation of solid catalyst component"). The solid catalyst component had a titanium atom content of 2.7 mass %, a magnesium atom content of 19.0 mass %, a halogen atom content of 62.1 mass %, and a total internal electron donor content of 12.2 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 10

A solid catalyst component was produced in the same manner as in Example 1, except that 0.25 ml (1.0 part by mass based on 100 parts by mass of diethoxymagnesium) of isobutanol was used instead of 0.25 ml of ethanol (see "(1) Preparation of solid catalyst component"). The solid catalyst component had a titanium atom content of 3.1 mass %, a magnesium atom content of 18.3 mass %, a halogen atom content of 61.7 mass %, and a total internal electron donor content of 13.0 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 11

A solid catalyst component was produced in the same manner as in Example 1, except that 20 g of diethoxymagnesium (average particle size: 54 μm, bulk density: 0.32 g/ml) having an ethanol content of 0.30 mass % was used as diethoxymagnesium, and the amount of toluene was changed from 50 ml to 70 ml (see "(1) Preparation of solid catalyst component"). The resulting suspension had a total ethanol content of 1.3 mass % based on 100 parts by mass of diethoxymagnesium. The solid catalyst component had a titanium atom content of 2.5 mass %, a magnesium atom content of 19.3 mass %, a halogen atom content of 62.3 mass %, and a total internal electron donor content of 12.0 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 12

A solid catalyst component was produced as described below.

A 500 ml round-bottom flask equipped with a stirrer, in which the internal atmosphere had been sufficiently replaced by nitrogen gas, was charged with 70 ml of titanium tetrachloride and 50 ml of toluene to prepare a solution, which was maintained at −10° C. A 200 ml round-bottom flask equipped with a stirrer, in which the internal atmosphere had been sufficiently replaced by nitrogen gas, was charged with 20 g of diethoxymagnesium (average particle size: 43 μm, bulk density: 0.32 g/ml) having an ethanol content of 0 mass % and 70 ml of toluene having an ethanol content of 0.36 vol % to prepare a suspension. The resulting suspension included ethanol in an amount of 1.0 part by mass based on 100 parts by mass of diethoxymagnesium. The entire suspension was added to the solution maintained at −10° C. The temperature inside the flask was increased from −10° C. to 110° C. After the addition of 26.3 mmol (6.1 ml) of di-n-propyl phthalate at 110° C., the mixture was reacted at 110° C. for 3 hours with stirring. After completion of the reaction, the supernatant liquid was removed by decantation, and the resulting solid product was washed four times with 200 ml of toluene (100° C.). After the addition of 120 ml of toluene and 20 ml of titanium tetrachloride, the mixture was reacted at 110° C. for 2 hours with stirring. After completion of the reaction, the supernatant liquid was removed by decantation, and the residue was washed eight times with 125 ml of n-heptane (40° C.), and dried under reduced pressure to obtain the target solid catalyst component.

The solid catalyst component had a titanium atom content of 2.9 mass %, a magnesium atom content of 18.4 mass %, a halogen atom content of 61.0 mass %, and a total internal electron donor content of 12.2 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 13

A solid catalyst component was produced in the same manner as in Example 1, except that the amount of ethanol was changed to 0.18 ml (0.7 parts by mass based on 100 parts by mass of diethoxymagnesium) (see "(1) Preparation of solid catalyst component"). The solid catalyst component had a titanium atom content of 2.7 mass %, a magnesium atom content of 18.9 mass %, a halogen atom content of 62.5 mass %, and a total internal electron donor content of 12.7 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Comparative Example 1

A solid catalyst component was produced in the same manner as in Example 1, except that the amount of ethanol was changed to 0.76 ml (3.0 parts by mass based on 100 parts by mass of diethoxymagnesium) (see "(1) Preparation of solid catalyst component"). The solid catalyst component had a titanium atom content of 3.6 mass %, a magnesium atom content of 18.7 mass %, a halogen atom content of 63.6 mass %, and a total internal electron donor content of 11.8 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. However, the resulting polymers were massive aggregates, and the particle size distribution and the VOC content could not be measured. The results are shown in Tables 1 and 2.

Comparative Example 2

A solid catalyst component was produced in the same manner as in Example 1, except that the amount of ethanol was changed to 0.40 ml (1.6 parts by mass based on 100 parts by mass of diethoxymagnesium) (see "(1) Preparation of solid catalyst component"). The solid catalyst component had a titanium atom content of 3.2 mass %, a magnesium atom content of 18.9 mass %, a halogen atom content of 63.2 mass %, and a total internal electron donor content of 12.1 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Comparative Example 3

A solid catalyst component was produced in the same manner as in Example 1, except that the amount of ethanol was changed to 0.05 ml (0.2 parts by mass based on 100 parts by mass of diethoxymagnesium) (see "(1) Preparation of solid catalyst component"). The solid catalyst component had a titanium atom content of 2.8 mass %, a magnesium atom content of 18.6 mass %, a halogen atom content of 62.4 mass %, and a total internal electron donor content of 12.2 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Comparative Example 4

A solid catalyst component was produced in the same manner as in Example 1, except that ethanol was not added (see "(1) Preparation of solid catalyst component"). The solid catalyst component had a titanium atom content of 2.7 mass %, a magnesium atom content of 18.7 mass %, a halogen atom content of 62.2 mass %, and a total internal electron donor content of 12.4 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 14

Two polymerization catalysts were prepared in the same manner as in Example 1, except that 0.13 mmol of diethylaminotriethoxysilane was used instead of 0.13 mmol of cyclohexylmethyldimethoxysilane (see "(2) Preparation of olefin polymerization catalyst 1a"), and 0.24 mmol of diethylaminotriethoxysilane was used instead of 0.24 mmol of cyclohexylmethyldimethoxysilane (see "(4) Preparation of olefin polymerization catalyst 1b"). Polypropylene and an ethylene-propylene copolymer were produced in the same manner as in Example 1, except that the resulting polymerization catalysts were used, and the properties were measured. The results are shown in Tables 1 and 2.

Example 15

Two polymerization catalysts were prepared in the same manner as in Example 1, except that 0.26 mmol of dicyclopentylbis(ethylamino)silane was used instead of 0.13 mmol of cyclohexylmethyldimethoxysilane (see "(2) Preparation of olefin polymerization catalyst 1a"), and 0.48 mmol of dicyclopentylbis(ethylamino)silane was used instead of 0.24 mmol of cyclohexylmethyldimethoxysilane (see "(4) Preparation of olefin polymerization catalyst 1b"). Polypropylene and an ethylene-propylene copolymer were produced in the same manner as in Example 1, except that the resulting polymerization catalysts were used, and the properties were measured. The results are shown in Tables 1 and 2.

Example 16

Two polymerization catalysts were prepared in the same manner as in Example 1, except that 0.13 mmol of 2-isopropyl-2-isobutyl-1,3-dimethoxypropane was used instead of 0.13 mmol of cyclohexylmethyldimethoxysilane (see "(2) Preparation of olefin polymerization catalyst 1a"), and 0.24 mmol of 2-isopropyl-2-isobutyl-1,3-dimethoxypropane was used instead of 0.24 mmol of cyclohexylmethyldimethoxysilane (see "(4) Preparation of olefin polymerization catalyst 1b"). Polypropylene and an ethylene-propylene copolymer were produced in the same manner as in Example 1, except that the resulting polymerization catalysts were used, and the properties were measured. The results are shown in Tables 1 and 2.

Example 17

A solid catalyst component was produced in the same manner as in Example 1, except that 5.9 ml (26.3 mmol) of diethyl benzylidenemalonate was used instead of 7.0 ml of di-n-butyl phthalate (see "(1) Preparation of solid catalyst component"). The solid catalyst component had a titanium atom content of 2.6 mass %, a magnesium atom content of 19.0 mass %, a halogen atom content of 61.7 mass %, and a total internal electron donor content of 13.4 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 18

A solid catalyst component was produced in the same manner as in Example 1, except that 2.1 ml (13.1 mmol) of (2-ethoxyethyl)ethyl carbonate and 3.4 ml (13.2 mmol) of 3,3-bis(methoxymethyl)-2,6-dimethylheptane were used instead of 7.0 ml of di-n-butyl phthalate (see "(1) Preparation of solid catalyst component"). The solid catalyst component had a titanium atom content of 2.1 mass %, a magnesium atom content of 18.8 mass %, a halogen atom content of 62.7 mass %, and a total internal electron donor content of 12.4 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

Example 19

A solid catalyst component was produced in the same manner as in Example 1, except that 5.3 ml (26.3 mmol) of diethyl tetrahydrophthalate was used instead of 7.0 ml of di-n-butyl phthalate (see "(1) Preparation of solid catalyst component"). The solid catalyst component had a titanium atom content of 2.8 mass %, a magnesium atom content of 18.0 mass %, a halogen atom content of 61.5 mass %, and a total internal electron donor content of 13.4 mass %.

Two polymerization catalysts were prepared in the same manner as in Example 1, except that the resulting solid catalyst component was used. Polypropylene and an ethylene-propylene copolymer were produced in the same manner as in Example 1, except that the resulting polymerization catalysts were used, and the properties were measured. The results are shown in Tables 1 and 2.

TABLE 2

|  | Amount of alcohol (parts by mass*) | ICP activity (g-ICP/ g-cat · hr) | Block ratio (mass %) | VOC content (mass ppm) |
|---|---|---|---|---|
| Example 1 | 1.0 | 16,200 | 20 | 2420 |
| Example 2 | 1.0 | 16,800 | 24 | 1980 |
| Example 3 | 1.3 | 16,000 | 23 | 2060 |
| Example 4 | 0.5 | 14,900 | 24 | 2880 |
| Example 5 | 1.0 | 14,400 | 23 | 2100 |
| Example 6 | 1.0 | 14,200 | 20 | 2030 |
| Example 7 | 1.0 | 15,400 | 21 | 2130 |
| Example 8 | 1.0 | 15,900 | 20 | 2200 |
| Example 9 | 1.0 | 13,200 | 20 | 2510 |
| Example 10 | 1.0 | 14,400 | 21 | 2340 |
| Example 11 | 1.3 | 15,000 | 22 | 2090 |
| Example 12 | 1.0 | 12,900 | 20 | 1810 |
| Example 13 | 0.7 | 13,400 | 22 | 2260 |
| Comparative Example 1 | 3.0 | 8,300 | 29 | No data available |
| Comparative Example 2 | 1.6 | 12,300 | 18 | 1430 |
| Comparative Example 3 | 0.2 | 15,100 | 23 | 4060 |
| Comparative Example 4 | 0 | 14,100 | 24 | 4850 |
| Example 14 | 1.0 | 11,000 | 18 | 2120 |
| Example 15 | 1.0 | 17,200 | 28 | 2200 |
| Example 16 | 1.0 | 16,700 | 22 | 2170 |
| Example 17 | 1.0 | 14,200 | 22 | 2030 |
| Example 18 | 1.0 | 13,700 | 23 | 2110 |
| Example 19 | 1.0 | 14,900 | 23 | 2240 |

*Amount based on 100 parts by mass of dialkoxymagnesium

As is clear from the results shown in Tables 1 and 2, it was confirmed that the solid catalyst components of Examples 1 to 19 that were produced by suspending a dialkoxymagnesium in an inert organic solvent in the presence of a specific amount of a specific alcohol, made it possible to polymerize an olefin with high polymerization activity when used for the olefin polymerization catalyst, and produce an olefin

TABLE 1

|  | Amount of alcohol (parts by mass*) | Homopolymerization activity (g-PP/g-cat) | MFR (g/10 min) | XS (wt %) | Fine powder content (wt %) | Coarse powder content (wt %) | SPAN | BD (g/cm³) |
|---|---|---|---|---|---|---|---|---|
| Example 1 | 1.0 | 54,000 | 4.8 | 1.4 | 0.3 | 0.6 | 0.56 | 0.42 |
| Example 2 | 1.0 | 52,800 | 4.5 | 1.1 | 0.3 | 0.5 | 0.51 | 0.40 |
| Example 3 | 1.3 | 54,600 | 5.6 | 1.4 | 0.5 | 0.7 | 0.58 | 0.39 |
| Example 4 | 0.5 | 52,800 | 5.3 | 1.3 | 0.6 | 0.3 | 0.46 | 0.41 |
| Example 5 | 1.0 | 49,100 | 4.0 | 1.4 | 0.4 | 0.7 | 0.59 | 0.40 |
| Example 6 | 1.0 | 48,900 | 17 | 2.0 | 0.1 | 0.2 | 0.44 | 0.40 |
| Example 7 | 1.0 | 50,800 | 12 | 2.8 | 0.1 | 0.3 | 0.47 | 0.40 |
| Example 8 | 1.0 | 55,300 | 6.0 | 1.6 | 0.4 | 0.5 | 0.52 | 0.40 |
| Example 9 | 1.0 | 50,700 | 5.9 | 1.3 | 0.4 | 0.6 | 0.59 | 0.40 |
| Example 10 | 1.0 | 49,500 | 5.5 | 1.4 | 0.5 | 0.6 | 0.61 | 0.39 |
| Example 11 | 1.3 | 53,100 | 6.0 | 1.4 | 0.5 | 0.5 | 0.58 | 0.38 |
| Example 12 | 1.0 | 52,200 | 5.8 | 1.3 | 0.4 | 0.4 | 0.49 | 0.40 |
| Example 13 | 0.7 | 50,600 | 5.8 | 1.3 | 0.4 | 0.4 | 0.52 | 0.41 |
| Comparative Example 1 | 3.0 | 30,800 | 9.7 | 3.1 | Could not be measured | Could not be measured | Could not be measured | 0.31 |
| Comparative Example 2 | 1.6 | 43,400 | 6.9 | 1.9 | 2.1 | 0.9 | 1.09 | 0.35 |
| Comparative Example 3 | 0.2 | 53,300 | 4.5 | 1.1 | 0.8 | 0.3 | 0.48 | 0.42 |
| Comparative Example 4 | 0 | 52,200 | 5.1 | 1.2 | 0.7 | 0.3 | 0.50 | 0.42 |
| Example 14 | 1.0 | 47,100 | 18 | 1.4 | 0.5 | 0.5 | 0.52 | 0.40 |
| Example 15 | 1.0 | 50,600 | 22 | 1.5 | 0.4 | 0.5 | 0.50 | 0.40 |
| Example 16 | 1.0 | 49,000 | 16 | 1.4 | 0.4 | 0.7 | 0.55 | 0.39 |
| Example 17 | 1.0 | 52,100 | 4.1 | 1.8 | 0.3 | 0.5 | 0.54 | 0.40 |
| Example 18 | 1.0 | 46,600 | 5.2 | 1.0 | 0.6 | 0.7 | 0.59 | 0.39 |
| Example 19 | 1.0 | 48,400 | 4.4 | 1.3 | 0.7 | 0.7 | 0.61 | 0.39 |

*Amount based on 100 parts by mass of dialkoxymagnesium polymer having a low fine powder content, a low coarse powder content, and a low volatile organic compound (VOC) content in high yield.

As shown in Tables 1 and 2, when using the solid catalyst components obtained in Comparative Examples 1 and 2 in which the amount of the alcohol added when producing the solid catalyst component was large (3.0 parts by mass or 1.6 parts by mass based on 100 parts by mass of the dialkoxymagnesium), the polymerization activity (homopolymerization activity and ICP activity) was low, and a massive polymer having a high MFR and a high xylene-soluble content (XS), for which the particle size distribution and the VOC content could not be measured, was obtained (Comparative Example 1), or a polymer having a high fine powder content, a high coarse powder content, and a large particle size distribution index (SPAN) was obtained (Comparative Example 2).

As shown in Tables 1 and 2, when using the solid catalyst components obtained in Comparative Examples 3 and 4 in which the amount of the alcohol added when producing the solid catalyst component was small (0.2 parts by mass or 0 parts by mass based on 100 parts by mass of the dialkoxymagnesium), the resulting polymers had a high VOC content.

INDUSTRIAL APPLICABILITY

The embodiments of the invention can thus provide a solid catalyst component for olefin polymerization that makes it possible to polymerize an olefin with high polymerization activity when used for an olefin polymerization catalyst, and produce an olefin polymer having a low fine powder content, a low coarse powder content, and a low volatile organic compound (VOC) content in high yield, an olefin polymerization catalyst that utilizes the solid catalyst component, and a method for producing an olefin polymer.

The invention claimed is:

1. A solid catalyst component for olefin polymerization that is produced by suspending (a) a dialkoxymagnesium, and (b) at least one alcohol selected from ethanol, n-propanol, n-butanol, isopropanol, isobutanol, and t-butanol, in an inert organic solvent so that a total amount of the alcohol is 0.5 to 1.5 parts by mass based on 100 parts by mass of the dialkoxymagnesium, to prepare a suspension, and bringing (c) an internal electron donor and (d) a titanium halide compound into contact with the suspension.

2. An olefin polymerization catalyst comprising:
 ($\alpha$) the solid catalyst component according to claim 1;
 ($\beta$) an organoaluminum compound represented by a general formula (I), $$R^1_p AlQ_{3-p} \tag{I}$$

wherein $R^1$ is a hydrocarbyl group having 1 to 6 carbon atoms, provided that a plurality of $R^1$ are either identical or different when a plurality of $R^1$ are present, Q is a hydrogen atom, a hydrocarbyloxy group having 1 to 6 carbon atoms, or a halogen atom, provided that a plurality of Q are either identical or different when a plurality of Q are present, and p is a real number that satisfies 0<p≤3; and
 ($\gamma$) an external electron donor compound.

3. The olefin polymerization catalyst according to claim 2, wherein the external electron donor compound ($\gamma$) is one or more compounds selected from an organosilicon compound represented by a general formula (II) and an aminosilane compound represented by a general formula (III), $$R^2_q Si(OR^3)_{4-q} \tag{II}$$

wherein $R^2$ is an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 15 carbon atoms, or a substituted aromatic hydrocarbon group having 6 to 15 carbon atoms, provided that a plurality of $R^2$ are either identical or different when a plurality of $R^2$ are present, $R^3$ is an alkyl group having 1 to 4 carbon atoms, a vinyl group, an alkenyl group having 3 to 12 carbon atoms, a cycloalkyl group having 3 to 6 carbon atoms, an aromatic hydrocarbon group having 6 to 12 carbon atoms, or a substituted aromatic hydrocarbon group having 7 to 12 carbon atoms, provided that a plurality of $R^3$ are either identical or different when a plurality of $R^3$ are present, and q is an integer from 0 to 3, $$(R^4R^5N)_s SiR^6_{4-s} \tag{III}$$

wherein $R^4$ and $R^5$ are a hydrogen atom, an alkyl group having 1 to 20 carbon atoms, a vinyl group, an alkenyl group having 3 to 20 carbon atoms, a cycloalkyl group having 3 to 20 carbon atoms, a cycloalkenyl group having 3 to 20 carbon atoms, or an aryl group having 6 to 20 carbon atoms, provided that $R^4$ and $R^5$ that form the $R^4R^5N$ group are either identical or different, and optionally bond to each other to form a ring, and a plurality of $R^4R^5N$ groups are either identical or different when a plurality of $R^4R^5N$ groups are present, $R^6$ is an alkyl group having 1 to 20 carbon atoms, a vinyl group, an alkenyl group having 3 to 12 carbon atoms, an alkoxy group having 1 to 20 carbon atoms, a vinyloxy group, an alkenyloxy group having 3 to 20 carbon atoms, a cycloalkyl group having 3 to 20 carbon atoms, a cycloalkyloxy group having 3 to 20 carbon atoms, an aryl group having 6 to 20 carbon atoms, or an aryloxy group having 6 to 20 carbon atoms, provided that a plurality of $R^6$ are either identical or different when a plurality of $R^6$ are present, and s is an integer from 1 to 3.

4. The olefin polymerization catalyst according to claim 3, wherein the external electron donor compound ($\gamma$) is phenyltrimethoxysilane, n-butyltrimethoxysilane, cyclopentyltrimethoxysilane, cyclohexyltrimethoxysilane, phenyltriethoxysilane, n-butyltriethoxysilane, cyclopentyltriethoxysilane, cyclohexyltriethoxysilane, t-butylmethyldimethoxysilane, t-butylethyldimethoxysilane, diisopropyldimethoxysilane, diisobutyldimethoxysilane, diisopentyldimethoxysilane, diphenyldimethoxysilane, dicyclopentyldimethoxysilane, cyclohexylmethyldimethoxysilane, cyclohexylcyclopentyldimethoxysilane, tetramethoxysilane, tetraethoxysilane, t-butylmethylbis(ethylamino)silane, dicyclohexylbis(ethylamino)silane, dicyclopentylbis(ethylamino)silane, bis(perhydroisoquinolino)dimethoxysilane, diethylaminotrimethoxysilane, or diethylaminotriethoxysilane.

5. The olefin polymerization catalyst according to claim 2, wherein the external electron donor compound ($\gamma$) is one or more compounds selected from a diether compound represented by a general formula (IV), $$R^7OCH_2CR^8R^9CH_2OR^{10} \tag{IV}$$

wherein $R^8$ and $R^9$ are a hydrogen atom, a halogen atom, an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a halogen-substituted aromatic hydrocarbon group having 6 to 12 carbon atoms, a substituted aromatic hydrocarbon group having 7 to 12 carbon atoms, an alkylamino group having 1 to 12 carbon atoms, or a dialkylamino group having 2 to 12 carbon atoms, provided that $R^8$ and $R^9$ are either identical or different, and optionally bond to each other to form a ring, and $R^7$ and $R^{10}$ are an alkyl group having 1 to 12 carbon atoms, a vinyl group, an alkenyl group having 3 to 12 carbon atoms, a cycloalkyl group having 3 to 6 carbon atoms, an aromatic hydrocarbon group having 6 to 12 carbon atoms, a halogen-substituted aromatic hydrocarbon group having 6 to 12 carbon atoms, or a substituted aromatic hydrocarbon group having 7 to 12 carbon atoms, provided that $R^7$ and $R^{10}$ are either identical or different.

6. The olefin polymerization catalyst according to claim 5, wherein the diether compound is 2-isopropyl-2-isobutyl-1,3-dimethoxypropane or 9,9-bis(methoxymethyl)fluorene.

7. A method for producing an olefin polymer comprising polymerizing an olefin in the presence of the olefin polymerization catalyst according to claim 2.

8. A method for producing an olefin polymer comprising polymerizing an olefin in the presence of the olefin polymerization catalyst according to claim 3.

9. A method for producing an olefin polymer comprising polymerizing an olefin in the presence of the olefin polymerization catalyst according to claim 4.

10. A method for producing an olefin polymer comprising polymerizing an olefin in the presence of the olefin polymerization catalyst according to claim 5.

11. A method for producing an olefin polymer comprising polymerizing an olefin in the presence of the olefin polymerization catalyst according to claim 6.

* * * * *